United States Patent Office 3,531,872
Patented Oct. 6, 1970

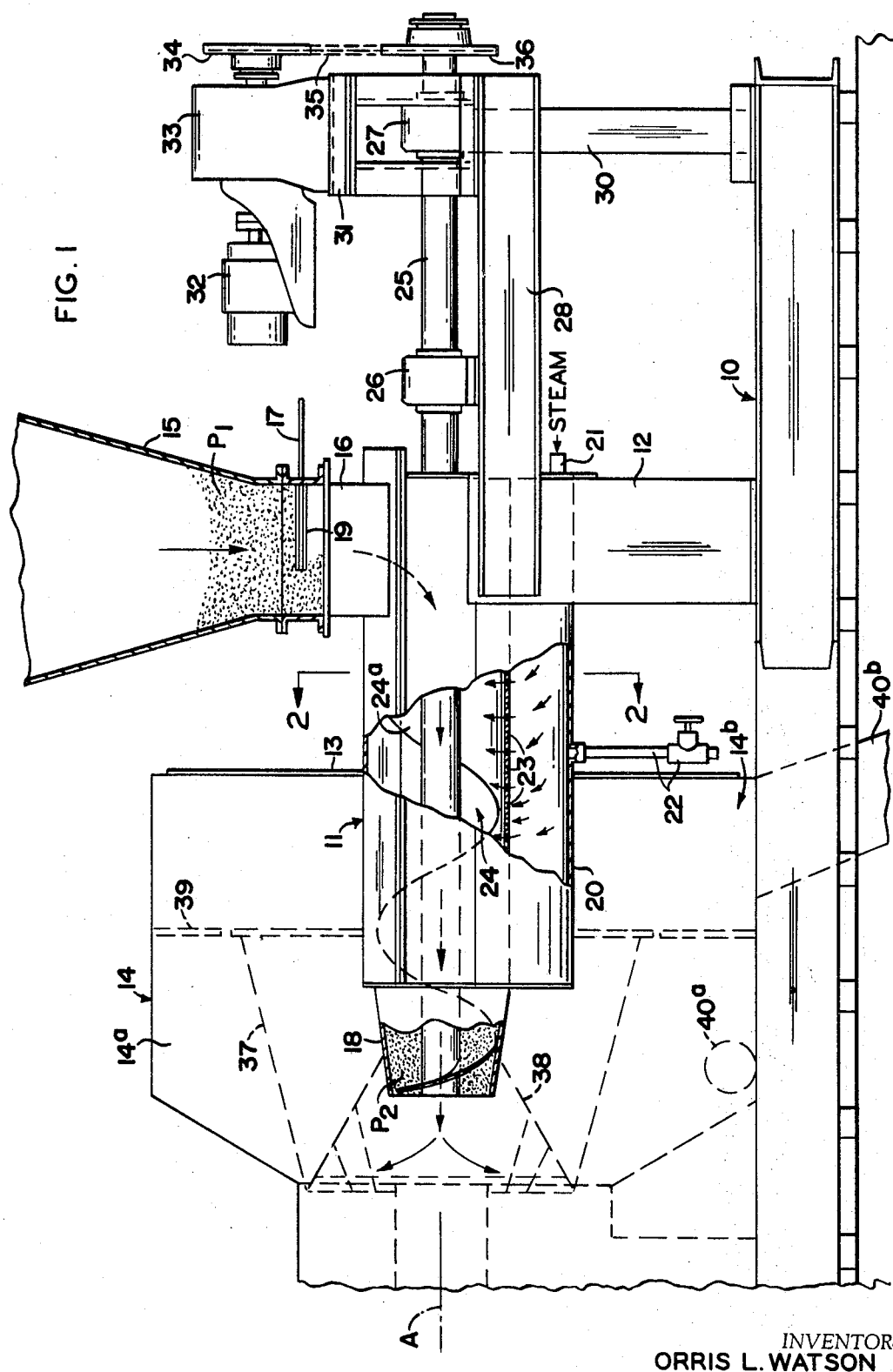

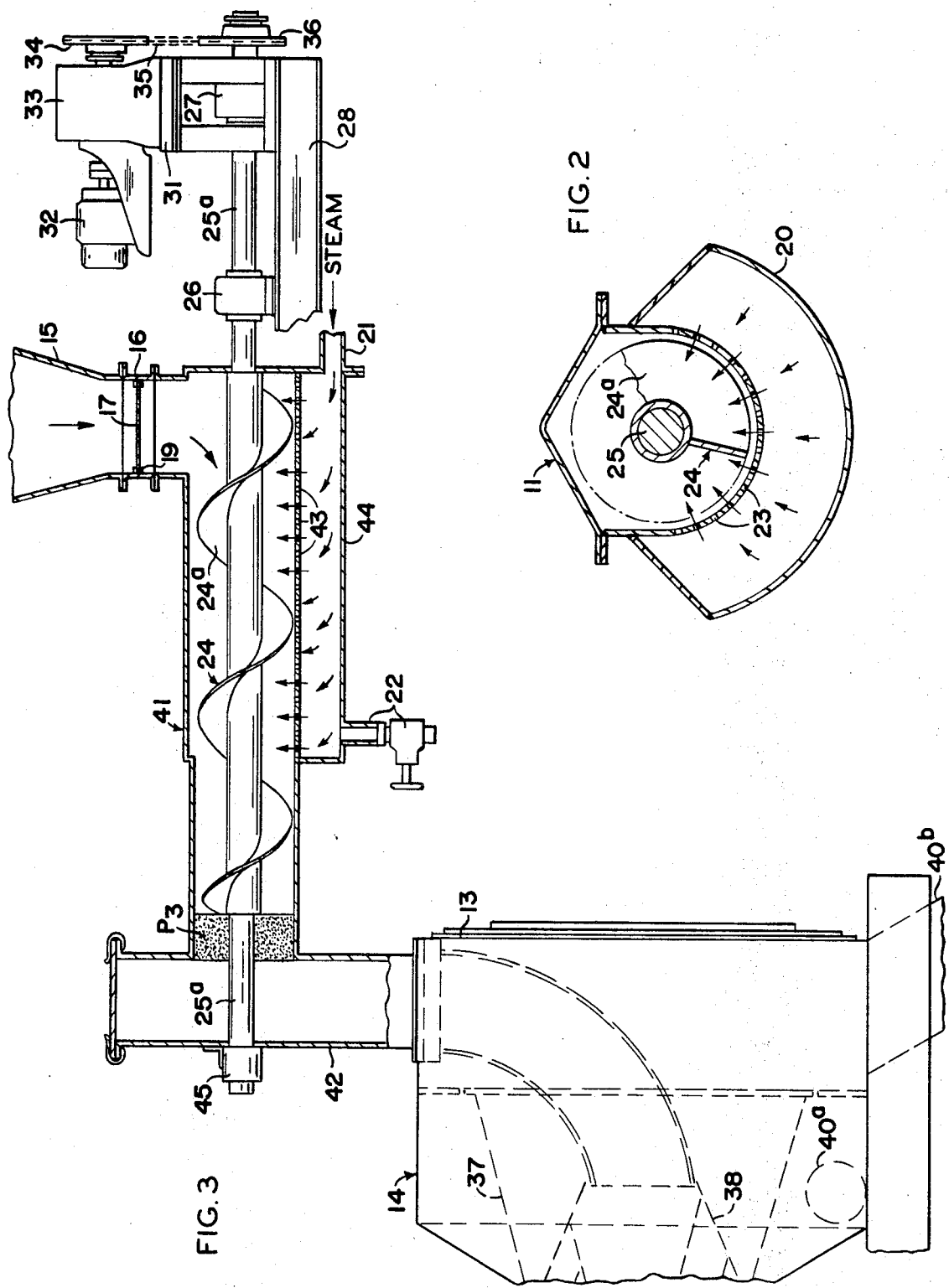

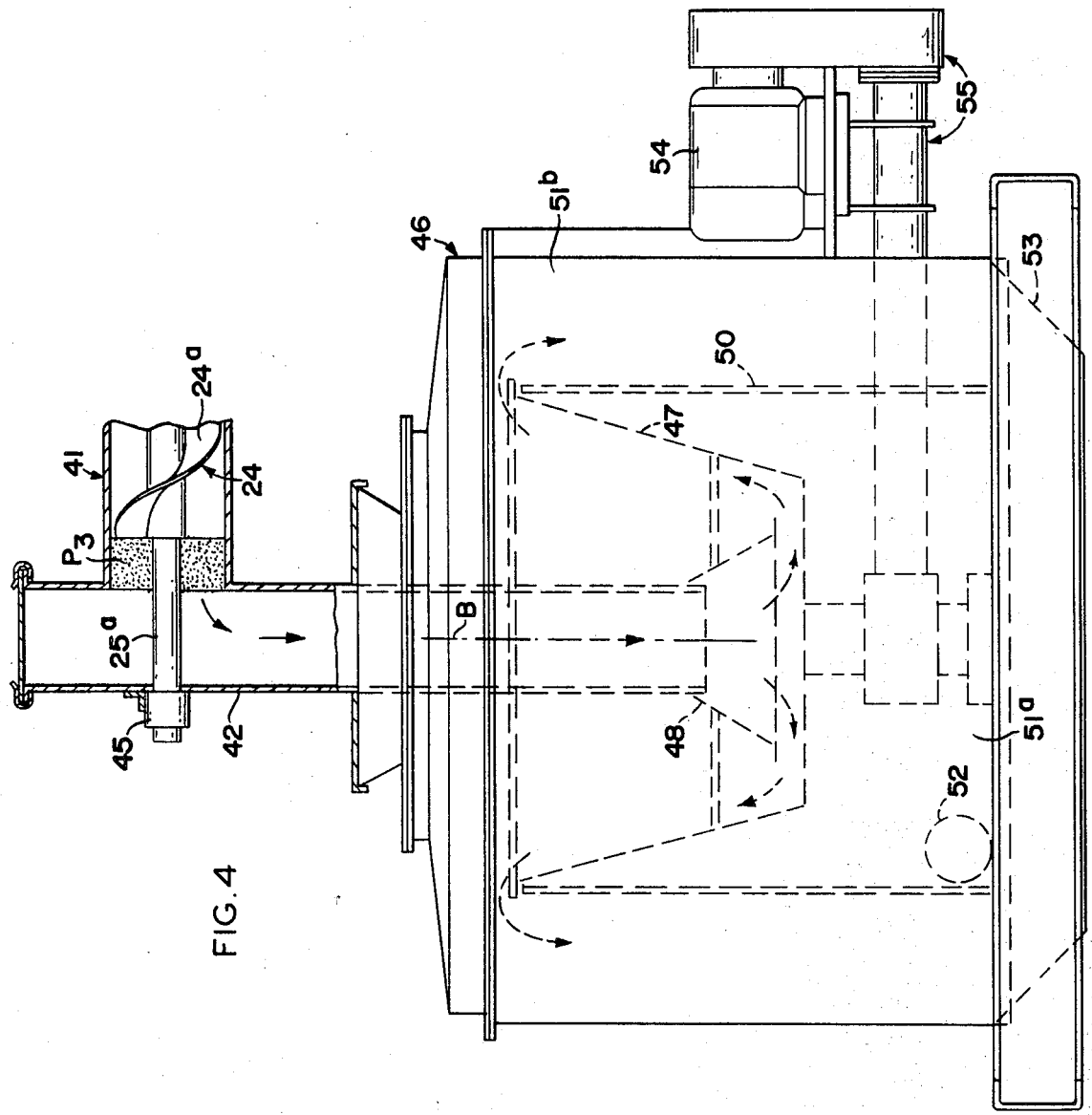

3,531,872
PROCESS AND APPARATUS FOR DELIQUIFYING FLUENT MATERIAL
Orris L. Watson, Cleveland, and David L. Springston, Hudson, Ohio, assignors, by mesne assignments, to Envirotech Corporation, Palo Alto, Calif., a corporation of Delaware
Filed Sept. 13, 1968, Ser. No. 759,685
Int. Cl. F26b 5/08; B01d 35/18
U.S. Cl. 34—8
19 Claims

ABSTRACT OF THE DISCLOSURE

Process and apparatus for heating a fluent liquid and particulate solid-containing material and then deliquifying it, preferably by centrifuging, in which the heating makes possible greater removal of liquid from the solids. The passage of the material through a treating chamber is retarded to form substantially gas-tight seals at the entrance and exit ends of the chamber while the material is contacted in the chamber between the seals with a heated gas such as steam. The seals are continuously formed of the fluent material and continuously release collected material to provide a throughput of the material without breaking the seals. This not only minimizes loss of the heating gas but prevents its escape to, and, in the case of steam, condensation within the deliquifying equipment. When the heating gas is steam, most, and preferably all of it, condenses within the chamber to raise the temperature of the liquid in such material.

The present invention relates to a process and apparatus for heating a fluent liquid and particulate solid-containing material preparatory to deliquifying it, such as by centrifuging, to make possible greater removal of liquids from the solids. More particularly, the present process and apparatus contemplate continuously passing such a material through a treating chamber while forming seals of the material at the entrance and exit of the chamber, and while subjecting the material in the chamber to a heated gas such as steam to heat the material.

In many industrial applications, it is desirable to deliquify a fluent liquid and particulate solid-containing material before the particulate material is shipped or otherwise processed, to reduce shipping weights and costs and to increase the value of the solids shipped.

While the present invention may be used for various purposes, it is especially advantageous in dewatering coal and, for purposes of illustration, is described in that connection. Coal as mined is usually washed for cleaning purposes but then must be dewatered. Since coal is frequently sold on the basis of B.t.u.'s per unit weight, the coal that is more nearly completely free of water is usually more efficient as a fuel because of the absence of moisture; moreover, its shipping costs are reduced since it contains a lesser weight of water. For these reasons it commands a higher price.

Thermal drying is often used for dewatering coal, but it is time-consuming and can degrade the coal. With coal of appropriate sizes, e.g., between about 28 mesh, U.S. standard sieve, and approximately ¾ inch in cross section, dewatering by centrifuging is much faster and does not have the disadvantage of thermally depreciating the quality of the coal.

In accordance with the present invention the efficacy of a centrifuging or like action in dewatering a material like wet coal is facilitated by first heating the coal. When the temperature of the surface water of wet coal or the like is raised an appreciable amount, more water may be removed from the coal than is otherwise possible with the same dewatering equipment. It may be that the heating reduces the surface tension of the water which is then more easily stripped from the coal. In one form of the invention, a fluent material exemplified by a body of particles of wet coal is contacted with a heated gas like steam while it continuously passes through a relatively confined, substantially gas-tight chamber, made so by impeding the flow of such material through the chamber at both its entrance and exit ends so that a plug or seal of the material is continuously formed at the ends. Preferably the coal and steam are thoroughly intermixed as the coal passes through the chamber. Steam is the preferred heated gas, since it effectively heats the liquid on the wet coal or other material as the steam condenses.

The accompanying drawing illustrates several embodiments of the invention in which:

FIG. 1 is a side elevational, partly in section, of one form of apparatus for heating wet coal by steam and feeding the heated wet coal into a basket, rotatable about a horizontal axis, of a dewatering centrifuge which may be of the vibrating or non-vibrating type;

FIG. 2 is a section of FIG. 1 on line 2—2;

FIG. 3 is a side elevation, partly in section, of another apparatus of the invention, designed for downward feeding to a basket rotatable about a horizontal axis; and FIG. 4 is a side elevational, fragmentary view showing the discharge end of still another apparatus having a heating portion like that of FIG. 3 but adapted for downward feeding to a centrifuge basket rotatable about a vertical axis.

In the apparatus of FIGS. 1 and 2 a base generally indicated at 10 supports a superstructure including a trough-like elongated chamber 11 held in position with respect to the base 10 by posts 12 and by the outer housing 13 of a centrifuge machine generally indicated at 14. The chamber 13, fabricated from sheet metal, is substantially enclosed except for means permitting entrance and exit of coal, and an entry for steam.

A converging feed hopper 15 and conduit 16 open into the chamber 11 at its right end as viewed in FIG. 1. The conduit 16 accommodates a gate 17 mounted in guides for movement transversely of the conduit so as to close it off entirely or provide a variable opening virtually up to the cross-sectional area of the section 16. The chamber 11 at its left end has a truncated cone section 18 that converges toward its discharge end for a purpose hereinafter described. A steam compartment 20, also fabricated from sheet metal, encompasses substantially the lower half of chamber 11 (FIG. 2) and has a steam inlet 21 and a valved outlet 22 permitting drawing of water or steam used for flushing the compartment. The lower wall of the chamber 11 is perforated as at 23 to permit the steam to pass into chamber 11 from compartment 20.

Suitable means are included to advance the material to be treated from the entrance adjacent the hopper 15 and conduit 16 to the exit 18 of the chamber 11. In the embodiment illustrated by FIGS. 1 and 2, such means includes a rotatable screw-type conveyor element 24 having a helical vane 24a that is rigidly fixed to a rotatable shaft 25 and cooperates with the inside of trough-like chamber 11 to force the fluent material through chamber 11 to its discharge end. The shaft extends in cantilever fashion to the end of the conical exit section 18 and is mounted for rotation in two outboard bearings 26 and 27 carried by beams 28. The helical vane 24a tapers inwardly at its free end to fit the cone section 18. The posts 12 in cooperation with auxiliary posts 30 support the beams 28 and shaft 25 with respect to the base 10. A support 31, mounted on the beams 28 to straddle the shaft 25, carries as power means to rotate the shaft, a variable speed motor 32 that through a reducer 33 rotates a pulley 34 linked by a belt 35 to another pulley 36 secured to shaft 25.

The centrifuge 14 receives the heated wet coal discharged from the chamber 11. The structure of such a centrifuge is well known and therefore is not here described in detail. In general, the housing 13 of the centrifuge contains an open-topped, perforate basket 37 mounted for driven rotation at high speed by conventional means (not shown) about a central horizontal axis A. Preferably, the centrifuge is of the vibratory type in that its basket 37 is reciprocated along its axis while being rotated to assist in the discharge of the dewatered solids from the basket. A vibratory centrifuge is particularly useful in the present invention, because there are less parts that can become clogged, and the cake is more easily removed from the basket.

A standard diverging cone 38, fixed to rotate with the basket 37, delivers the wet coal to the bottom of the basket from where the coal passes outwardly and axially of the basket along its perforate side. A fixed ring partition 39 separates the housing 13 into a liquid recovery zone 14a having a liquid discharge port 40a and a solids recovery zone 14b having a solids discharge chute 40b. Centrifuges of this type are well known, being disclosed in Wemco Siebtechnik Horizontal Vibratory Centrifuge Bulletin No. D1–B5, and Wemco Siebtechnik Technical Manual, Bulletin D1–B6, both published by Arthur G. McKee & Co. of Cleveland, Ohio.

The embodiment of FIG. 3 is similar to that of FIGS. 1 and 2, except that the discharge end of the heating chamber is formed differently, and the fluent material is discharged downwardly to the basket of the centrifuge. In this case, heating chamber 41 is longer than in the preceding embodiment and terminates in a downwardly extending conduit 42 which curves to discharge into inner directing cone 38 of the basket 37 of centrifuge 14, which may be identical with that of the previous embodiment. The chamber 41 has perforations 43 opening into a compartment 44 to which steam is supplied. The other parts such as the hopper, screw-type conveyor, power drive, etc. are similar to those parts of the embodiment of FIGS. 1 and 2, and therefore the same reference numbers are used to indicate the corresponding parts. However, it is emphasized that in this embodiment a shaft 25a is supported at both ends, having an outboard end bearing 45 on the side of the conduit 42 opposite that facing chamber 41, and the conveyor 24 stops short of reaching the downcomer section 42 to cause a plug of coal to build continuously at the discharge end of chamber 41, as hereinafter more fully described. Since the centrifuge 14 of FIG. 3 is identical to that illustrated in FIG. 1, its parts have been numbered with corresponding reference characters.

FIG. 4 illustrates the combination of the heating portion of the embodiment of FIG. 3 with a known vibratory centrifuge, generally shown at 46, in which a screening basket 47 rotates about a vertical axis B while being reciprocated axially. In this case also, a diverging cone 48 rotates with the basket 47. A fixed circular partition 50 divides housing 51 of the centrifuge into a cylindrical inner liquid recovery section 51a having a run-out port 52 and an outer, generally annular solids recovery section 51b having a coal discharge chute 53. A motor 54 rotates the basket 47 through conventional means generally indicated at 55.

In operation of the embodiment of FIGS. 1 and 2, wet coal continuously passes into the hopper 15 from a suitable source, not shown. The rate of feed of the coal and the adjustment of the movable gate 17 are such that the lower portion of the hopper is completely filled with coal so as to form a plug $P_1$. Depending largely on the speed of rotation of the shaft 25, the position of gate 17 is regulated to insure that the rate at which wet coal is supplied to the hopper 15 at least equals the rate at which wet coal is released to the chamber 11. In this manner, the seal formed by plug $P_1$ is never broken.

As the screw conveyor 24 advances the wet coal to the left as viewed in FIG. 1, steam supplied to the compartment 20 enters the chamber 11 through the perforations 23. As the steam condenses, it raises the temperature of the water on and in the wet coal and aids the subsequent dewatering action. Maximum efficiency is obtained when all of the steam is condensed within the chamber 11. The length of the compartment 20 is determined by the volume of steam required to raise the temperature of the wet coal being treated to the desired point to produce the desired effectiveness of dewatering of the coal in the centrifuge 14. In addition to moving the material through the chamber 11, screw conveyor 24 completely mixes the steam or other heated gas with the wet coal.

At the exit end of the chamber 11, the converging conical section 18 compresses the coal that has been steam treated, due to the decreasing cross-sectional area of the section, to form a second seal taking the form of a plug $P_2$ of the coal. As additional wet coal is packed into plug $P_2$, the preceding coal is forced free, so the plug $P_2$ is continuously maintained, while a throughput of coal is also continuously maintained through the apparatus. The continuously maintained plugs, $P_1$ and $P_2$, in combination with the substantially continuous sidewalls of chamber 11, make possible maintenance of a substantially gas-tight space within the chamber 11. This minimizes loss of steam into the atmosphere, but, even more significantly, prevents flow of the steam into the centrifuge 14 where it could condense in housing 13 and rewet the dewatered coal. It is permissible, even desirable, for steam to condense within the chamber 11 on the wet coal, since condensation raises the temperature of the residual wash water wetting the coal; the small amount of added water resulting from condensation being readily removed by the centrifuge. However, condensation of steam within the centrifuge housing 13 should be avoided.

As the wet coal and its heated water leave section 18, the diverging cone 38 of the centrifuge basket 37 delivers it to the bottom of the basket. The high speed rotation of the basket in a conventional manner separates water on the wet coal from the coal, the separated water passing through openings of the basket into the zone 14a and out through port 40a. The coal moves outwardly and discharges at the large open end of the basket 37 into zone 14b and then through discharge chute 40b. The operation of the apparatus may, as is preferable, be continuous.

The operation of the embodiment of FIG. 3 is similar to that described except for the formation of the plug at the exit end. Since the shaft 25a stops short of reaching conduit 42, the wet coal accumulates within the zone of the chamber 41 between the end of the screw conveyor element 24 and the conduit 42 to form a seal indicated as a plug $P_3$. As additional wet coal is continuously added to one end of the plug $P_3$ by the screw conveyor element, coal at the other end of the plug is forced free and into the conduit 42 which delivers it to the centrifuge 14.

FIG. 4 illustrates that it is not necessary to use a centrifuge having a screening basket rotatable about a horizontal axis, and that conduit 42 may also deliver directly to a centrifuge basket 47 which rotates about a vertical axis. In this case, the diverging cone 48 of the basket 42 directs the charge to the centrifuge to the bottom of the basket. The water passes through the perforate basket side walls into zone 51a and thence through a discharge port 52. The dewatered coal moves outwardly due to centrifugal force and is discharged over the lip at the top of the large open end of the basket 47 into zone 51b, from which it leaves the centrifuge through chute 53.

In one typical run, utilizing one of the illustrated forms of apparatus, saturated steam at a temperature of about 250° F. was used and forced into the treating chamber at a pressure within the range of 6 p.s.i.g. to 27 p.s.i.g.

Fine coal between about 28 mesh and ¾ inch in cross-sectional size was sufficient to be passed through the treating chamber at a rate of 40 tons per hour. A vibratory centrifuge received the heated wet coal in a stainless steel, usually frusto-conical basket rotatable about a horizontal axis at a speed in the range of 300 to 450 revolutions per minute. The side walls of the basket had generally axially extending slots through the wall, measuring about 0.4 mm. in width. In coal thus treated and dewatered there remained about 4.25 percent by weight of moisture. When preheating in accordance with the present invention was omitted and the centrifuge used alone, the dewatered coal had a moisture content of 6 to 7 percent by weight.

Various modifications of the invention are possible. For example, while the invention has been described in connection with dewatering coal, it is applicable to many liquid-particulate solid combinations, such as aqueous slurries of sand, refractory aggregates, ores, chemicals, and brines of crystallized salt. At times the separated liquid may be the more desired component as in the dewatering of underground solutions of soluble minerals containing solid waste matter. Also, although steam is preferred, any heated gas may be used which is not reactive with the material being treated, such as air, carbon dioxide, nitrogen, etc., since the purpose of the heated gas is to raise the temperature of the water or other liquid adhering to the material to be deliquified.

While the foregoing describes several embodiments of the invention, it is understood that other modifications of the invention may be made within the scope of the following claims.

What is claimed is:

1. Apparatus of the character described comprising a treating chamber having entrance and exit ends adapted, respectively, to receive and discharge fluent liquid and particulate solid-containing material, means to advance said material through the chamber, retarding means adjacent each of said entrance and exit ends to impede the flow of said material therethrough and effective to form a substantially gas-tight seal of said material at both ends, means to feed a heated gas into said treating chamber intermediate said entrance and exit ends, and deliquifying means to receive the heated material discharging from said chamber.

2. The apparatus of claim 1 wherein said advancing means also simultaneously intermixes said fluent material and heated gas.

3. The apparatus of claim 1 wherein said advancing means is a rotatable screw-type conveying member disposed generally longitudinally of said chamber.

4. The apparatus of claim 1 wherein said retarding means adjacent the entrance end is an adjustable gate to afford a variable opening therethrough while supporting a supply of said liquid and solid-containing fluent material to form a plug defining the seal at that end.

5. The apparatus of claim 1 wherein said retarding means adjacent the exit end includes a section of said treating chamber effective to accumulate said material therein and form a plug defining said seal at said exit end.

6. The apparatus of claim 1 wherein said retarding means adjacent the exit end includes a converging section of the chamber effective to compress said material and form a plug defining said seal.

7. The apparatus of claim 1 wherein said advancing means terminates short of said exit end to define a zone between the terminus of said means and exit end effective to accumulate said material therein and form a plug defining said seal.

8. The apparatus of claim 1 wherein said means to feed a heated gas includes a jacket at least partially embracing said chamber and having a plurality of openings interconnecting said jacket and chamber that are disposed generally longitudinally of the chamber.

9. The apparatus of claim 1 wherein said deliquifying means is a centrifuge.

10. The apparatus of claim 9 wherein said centrifuge is a vibratory centrifuge.

11. Apparatus of the character described comprising in combination: a heating chamber having entrance and exit ends adapted, respectively, to receive and discharge wet coal, retarding means adjacent each of said entrance and exit ends to impede the flow of the coal and effective continuously to accumulate said coal and form a substantially gas-tight seal therefrom at each end while continuously releasing previously accumulated coal to provide a continuous throughput of the coal without breaking said seal, a jacket to feed steam into the chamber at least partially embracing said chamber and having a plurality of openings disposed generally longitudinally interconnecting said jacket and chamber, a rotatable screw-type conveying member disposed generally longitudinally of said chamber to advance the coal therethrough and simultaneously intermix it with the steam, and a centrifuge to receive the heated wet coal discharging from said chamber.

12. A process for deliquifying a fluent liquid and particulate solid-containing material comprising passing said material through a treating chamber having entrance and exit ends, retarding the flow of the material through both of said ends to form a substantially gas-tight seal of said material at each end, contacting said material while within the chamber with a heated gas, adding a fresh portion of said material to each seal while releasing a previously collected portion to maintain a flow of said material through the chamber, and deliquifying the material released from the chamber.

13. The process of claim 12 wherein said material is wet coal.

14. The process of claim 12 wherein the heated gas is steam.

15. The process of claim 14 wherein at least some of the steam is condensed within the chamber further to raise the temperature of the liquid of said material.

16. The process of claim 12 wherein said fluent liquid and solids-containing material and heated vapor are admixed during passage of the material through said chamber.

17. The process of claim 12 wherein said deliquifying is by centrifuging.

18. A process for dewatering wet coal comprising passing the coal through a heating chamber having entrance and exit ends, retarding the flow of the coal through both of said ends to form a substantially gas-tight seal of the coal at each end, adding a fresh portion of the coal to each seal while releasing a previously collected portion to maintain a flow of the coal through the chamber, contacting the coal while within the chamber with steam, condensing at least some of the steam within the chamber further to raise the temperature of the water of the wet coal, and then centrifuging the heated coal received from the chamber to remove water therefrom.

19. The process of claim 18 wherein said coal has an average size ranging from about 28 mesh, U.S. standard sieve, to about ¾ inch in cross section.

References Cited

UNITED STATES PATENTS 2,254,867  9/1941  Bonotto _____ 34—8

FOREIGN PATENTS 625,521  6/1949  Great Britain.

SAMIH N. ZAHARNA, Primary Examiner

U.S. Cl. X.R.

34—12, 60; 210—71, 78, 179